United States Patent Office 3,004,651
Patented Oct. 17, 1961

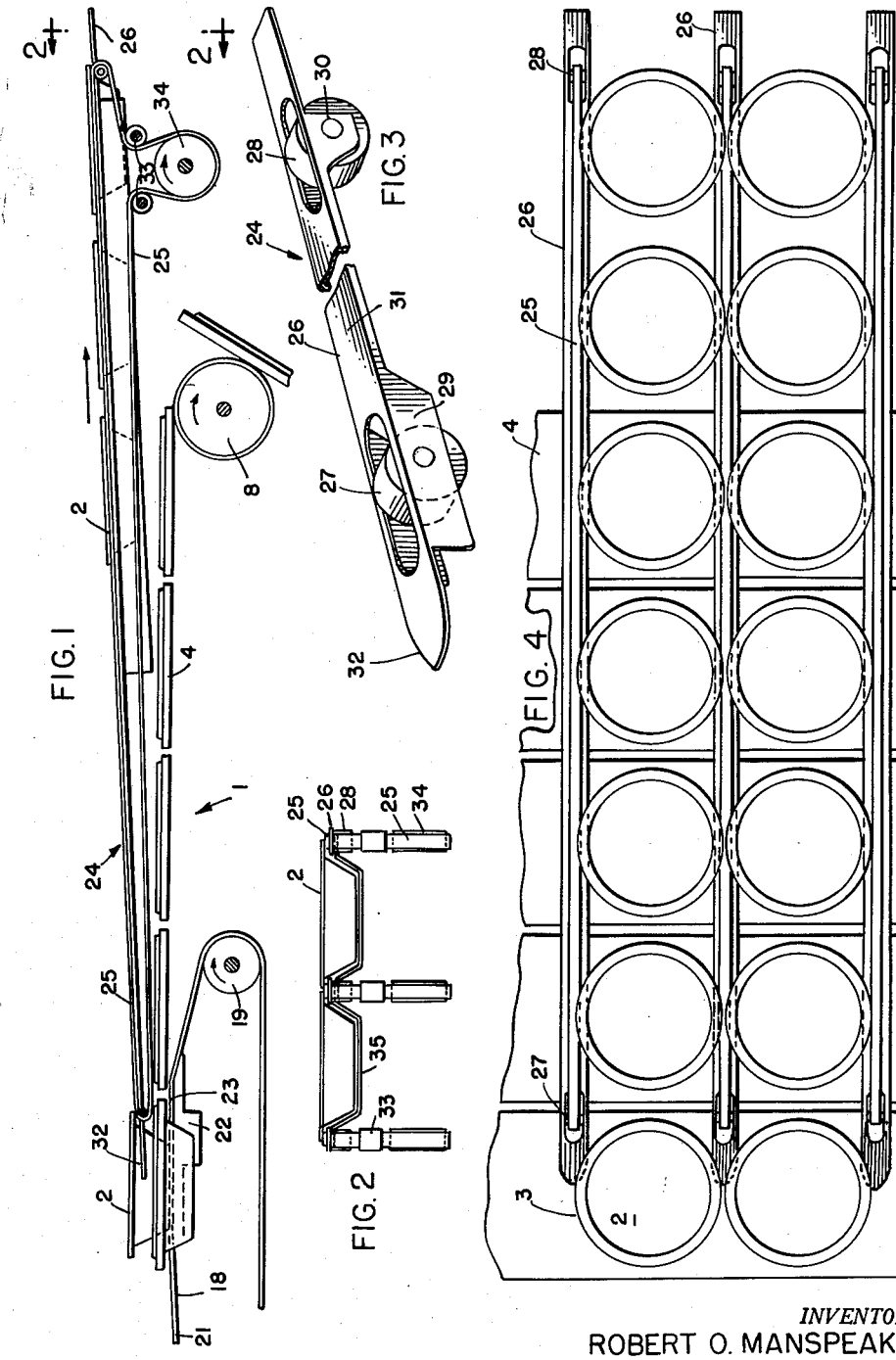

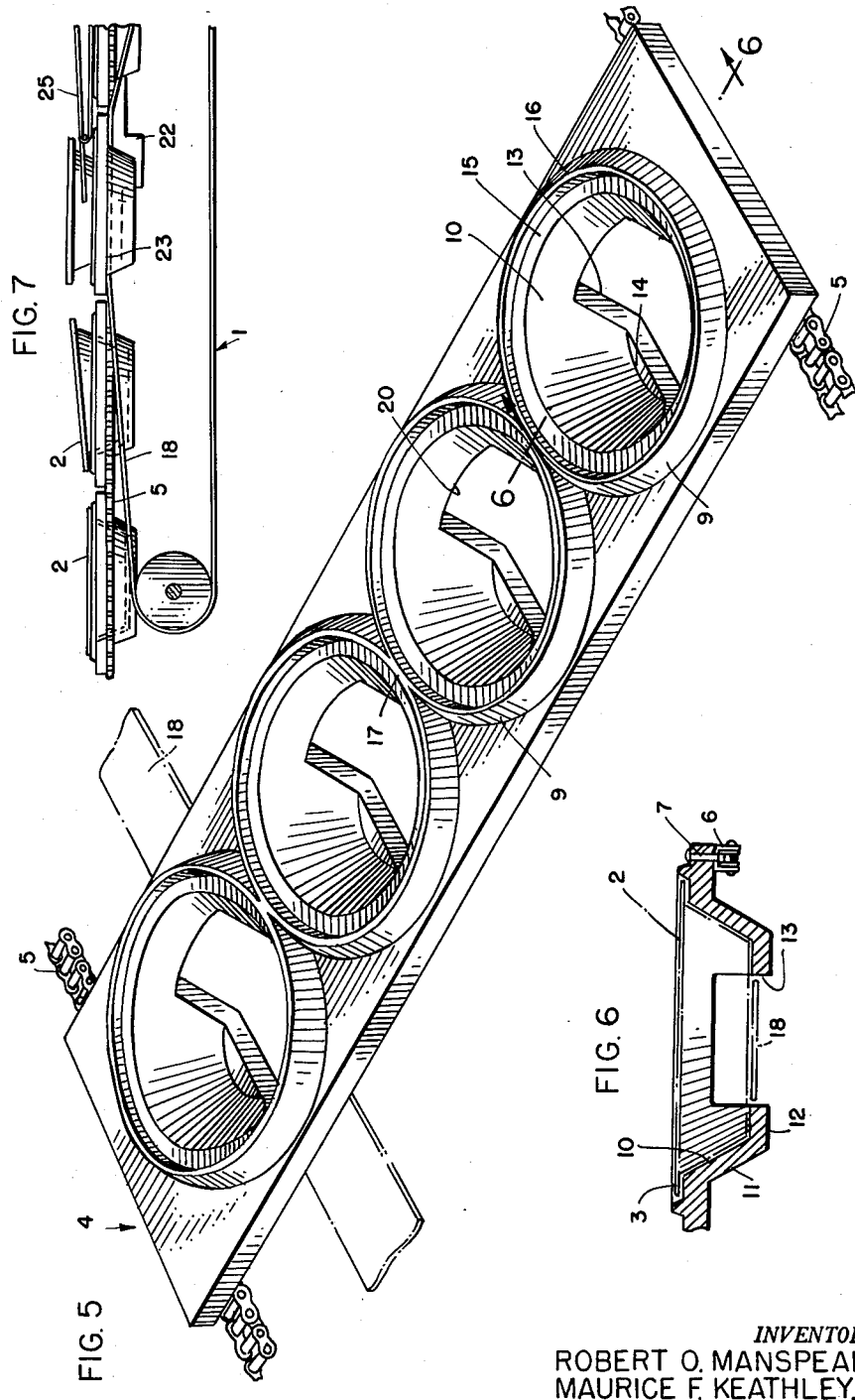

3,004,651
CONVEYOR APPARATUS FOR FOODSTUFFS
Robert O. Manspeaker, 1120 McNeil St., and Maurice F. Keathley, Sr., 2271 Young Ave., both of Memphis, Tenn.
Filed June 4, 1956, Ser. No. 589,302
7 Claims. (Cl. 198—185)

This invention relates to conveyor apparatus for transporting articles of food, especially receptacles and the like containing foodstuffs. The apparatus is particularly useful for conveying bakery goods and other foodstuffs in receptacles, which are fragile or fluid in nature, tending to be easily damaged or spilled.

An important problem in the art of conveying foodstuffs is to provide apparatus for manufacturing, processing, or filling and conveying them, in or out of receptacles, and transferring them to successive apparatus and operations without damage or spillage. This problem is encountered with foodstuffs both prior to and subsequent to baking, freezing, and wrapping or packaging, in the manufacture of various food products, such as cakes, cookies, pies, tarts, and others.

It is therefore an object of the present invention to provide conveyor apparatus, including conveyors and food receptacle holders, which are especially advantageous in connection with the conveyance of articles of food, which overcome the disadvantages of prior constructions and furnish important improvements thereover.

An important object is to provide apparatus for conveying foodstuffs which require careful handling, that is, which are fragile or otherwise readily damaged, or which are prone to spillage.

Another object is to provide a conveyor assembly which serves to transport bakery goods between processing points, and serves to remove the receptacles from a conveyor and convey them elsewhere, to a further conveyor or collector, as desired.

A particular object is to provide a food receptacle holder especially useful for transporting food receptacles and for removing the receptacles therefrom.

An additional object is to provide apparatus especially suited for filling and transporting pie pans and the like, and a holder for transporting a pie pan and constructed for removal of the pan and contents therefrom. The holder provided is also constructed for directly molding and forming a pie on a pie pan therein.

Another object is to provide a compact, relatively simple, yet reliable and effective conveyor assembly and food receptacle holder constituting a part of the assembly. The apparatus is especially suitable for rapid, continuous operation in large bakeries where quantity production of high quality products is desired.

These and other objects, advantages and functions of the invention will be apparent on reference to the specification and to the attached drawings, in which like parts are identified by like reference characters in each of the views, and in which:

FIGURE 1 is a partial elevational and schematic view of a preferred embodiment of the conveyor assembly of the invention, illustrating the transfer of receptacles from one conveyor to another.

FIGURE 2 is a partial end elevational view on line 2—2 of FIGURE 1.

FIGURE 3 is an enlarged perspective view of the supporting structure for one conveyor, serving to remove receptacles from above another conveyor.

FIGURE 4 is a partial plan view of the conveyor assembly illustrated in the preceding views.

FIGURE 5 is an enlarged perspective view of a preferred food receptacle holder plate as also illustrated in the remaining views, illustrating its mounting on a conveyor.

FIGURE 6 is an elevational sectional view of the receptacle holder taken on line 6—6 of FIGURE 5; and FIGURE 7 is a view like FIGURE 1, illustrating the elevation of the receptacles from the first conveyor.

The invention resides particularly in a new combination and arrangement of apparatus for accomplishing the desired objects, and in a food receptacle holder and the combination therewith, especially useful in the conveyor assembly or in other apparatus of similar type. More particularly, a conveyor assembly for transporting foodstuffs is provided, which includes a conveyor, recessed bakery receptacle holders movable therewith and having bottom openings in the recessed portions of the holders, and another conveyor arranged to contact articles through the openings and unseat them from the holders.

Preferably, further conveyors are arranged to extend over the holders in their positions wherein receptacles are unseated, to engage the unseated receptacles for removal. It is also preferred to employ in the assembly, recessed unitary food receptacle holders which have openings in the bottoms and sides of the recessed portions of the holders. The new apparatus is especially adapted for filling and transporting pie pans and their contents, preparing the pies therein and transferring the pie pans from the holders to a further conveyor without spillage or damage. Most advantageously, the apparatus removes the receptacles from the receptacle holders by elevating the receptacles therefrom at a slight angle, employing conveyors at an angle to the conveyor for the holders, the conveyors being driven synchronously in the same direction.

In a preferred embodiment, a pie pan holder plate for filling and transporting a plurality of pie pans and constructed for removal therefrom, is provided which embodies a unitary construction of an aligned plurality of recessed pie pan holders each having a bottom opening for travel of a conveyor therethrough, the opening extending transversely of the holder alignment, and each holder having a circumferential upstanding dough cutting edge.

The drawings illustrate a conveyor assembly 1 for transporting articles or receptacles from filling or processing locations and the like to a point where they are removed for other processing, packaging or distribution. Thus, the conveyor assembly is aligned and registered with suitable apparatus for placing empty or filled receptacles on the assembly and with filling, covering, coating and like apparatus. In the illustrated embodiment, the apparatus is constructed for manufacturing and conveying pies in conventional pie pans or tins 2 having laterally outwardly extending lips, flanges or rims 3. After placing the pie pans on the assembly, they may be conveyed, for example, under a dough sheeter, then to a docker, to a filler, to a second dough sheeter for placing the top dough or crust thereon, then to a crimper or marker, and then to a cut-off roller or docker type cut-off. After these operations, they are to be removed from the initial conveyor for conveyance to various locations, such as ovens, freezers, packaging equipment and so forth.

The conveyor assembly 1 includes an endless series or file of multiple receptacle holder plates 4 which are mounted in parallel and equally spaced entirely around a pair of endless chain conveyors 5. The holder plates 4 are connected to the conveyor chains by fastening means such as links 6 connected by bolts or screws 7 to opposite ends of the holder plates, the links serving to replace corresponding links in the conveyor chains. The endless conveyor chains and the holder plates travel through the various operations, generally in horizontal planes as illustrated, and then reverse direction and return to the starting point upon passing around sprocket wheels or the like, such as drive sprocket 8.

Each holder plate 4 is preferably constructed as a unitary lightweight aluminum casting having a plurality of aligned unitary or one-piece food receptacle holders 9. Each receptacle holder 9 includes a pan or dish-shaped recess 10, providing frusto-conical sides 11 and a horizontal bottom or base 12. An elongated opening 13 is provided through the bottom 12 and in opposite sides 11 of the holder, for travel of a conveyor through the opening in a direction transverse to the holder plate 4 and parallel to the endless chains 5. Provision of the opening 13 leaves a pair of opposite ledges or shoulders 14 in the bottom 12 of the holder, upon which pie pans are seated.

The top of the holder 9 is provided with an annular rim or shoulder 15, upon which the lip or flange 3 of the pie pan rests. A circular upstanding cutting edge 16 is also formed on the holder 9, radially outwardly of the recessed portion 10 and the rim 15. The cutting edges 16 of adjoining holders 9 merge at 17 in a common cutter edge.

In the manufacture of pies and the like, pie pans are seated in the holders 9, such as by dropping them thereon or reciprocating gripping means up through the openings 13 in the holders, such as suction cups, and pulling the pans onto the holders. The first sheet of dough is then placed on the pans, the filling is deposited on the dough, a second sheet of dough is placed over the filling, and rollers or the like are employed to cut off the dough between them and the cutting edges 16. The construction thus serves both for manufacturing and, as will be described in greater detail, for conveying and removing the pies. An especially advantageous feature of the construction is the provision of cutting edges 16 which merge at 17. This construction produces large savings in dough, which cannot be reworked for reuse to provide the same quality of product.

After the pie pans 2 have been filled and the contents processed while in the holder plates 4, they are conveyed by the initial conveyor comprising a pair of the endless chains 5 to a removal zone, where the pie pans and their contents are removed from the conveyor and conveyed elsewhere. For this purpose, a second longitudinal conveyor is provided which constitutes an endless elevating or unseating belt 18 driven by conventional means, such as by a drive roller 19. The endless belt is driven in parallel to the conveyor chains 5, and one belt is driven centrally of each of the holders 9 in the holder plate 4, traveling upwardly from beneath the holder to points adjacent the upper extremities 20 of the elongated opening 13 in the holder.

As illustrated in FIGURES 1 and 7, the upper portion 21 of the endless belt travels over a raised and bevelled support 22, causing the belt to travel first upwardly at a slight angle from the horizontal, then horizontally, and then downwardly around the drive roller 19. The conveyor belt 18 travels at a rate such as will provide the same linear horizontal velocity as the conveyor chains 5, thereby traveling synchronously in the same horizontal direction. In this manner, as the pie pans 2 are conveyed on the mold plates 4 by the conveyor chains 5 to the removing zone, the pie pans are contacted through the bottom openings 13 in the holders by the conveyor belt 18. The conveyor belt causes the pie pans to assume a position slightly inclined from the horizontal until they arrive at an unseated and raised horizontal position on the horizontal portion 23 of the conveyor belt, on the belt support 22. During this operation, the pans are maintained in the same longitudinal relationship to the holders 9, owing to the synchronization of the two conveyors.

The construction of the second conveyor assembly including the endless belt 18 is preferred for accomplishing the objects of the invention, of unseating the pie pans smoothly and evenly, without jarring or spilling the contents. However, it will be apparent that other construction can be employed in equivalent manner to unseat the pans.

The pie pans and their contents are then in position for removal by a third conveyor assembly 24, which removes the pie pans by their lips on opposite sides thereof. As illustrated in FIGURES 3 and 4, the third conveyor assembly constitutes an endless removal conveyor belt 25 mounted on a supporting arm 26 and on idler rollers 27 and 28 mounted in depending brackets 29 and 30, respectively, forming parts of the arm. The belt 25 travels over the upper surface 31 of the conveyor arm, and the pie tin lips are seated and carried on the belt.

A plurality of removing conveyors 24 is employed with the receptacle holder plate, one more than the number of holders 9. One removing conveyor 24 is provided on each of two opposite sides of each holder 9, one conveyor being inserted between each pair of adjacent pie pans 2 and holder elements 9, and one conveyor being provided at each end of the holder plate 4. The removing conveyors 24 likewise travel longitudinally of the conveyor assembly 1 and are driven synchronously in the same horizontal direction, the horizontal velocity being the same as that of the conveyor chains 5.

The rearwardly extending end 32 of each removing conveyor arm 26 is tapered for insertion of the arm and the removing belt 25 beneath the adjacent lips 3 of the pie pans, which by then are spaced over the holder plates 4. In this manner, as the unseated pie pans are conveyed by the elevating conveyor belt 18, they are picked up by the removal conveyor belt 25 and removed at a slight angle from the horizontal completely out of and away from the holder plates 4. Transfer between the conveyors is thus effected without damage to or spillage of the contents, and the receptacles may be conveyed to any desired location.

The upward inclination of the endless elevating belt 18 and that of the endless removing belt 25 should be slight, preferably a maximum of about 8° from the horizontal, for elevation and removal without damage. It has been found that this construction and arrangement guarantees the safe conveyance and removal of the receptacles of foodstuffs, whereas other constructions are unreliable and prone to spill and damage the foodstuffs. The construction furnishes a high rate of travel and rapid, continuous operation.

The removing belt 25 of the removing conveyor assembly 24 is mounted and driven in a manner which avoids interferences with the lateral rows or ranks of pie pans 2 being removed. For this purpose, the small idler rollers 27 and 28 are employed in the vicinity of the pan lips. A further pair of idler rollers 33 is employed on the reverse side of the removing belt, for looping the belt and driving it in the loop by a forward drive roller 34, which may be located beneath the removing conveyor assembly. The construction illustrated, including the rollers, the narrow removing belt 25 and the narrow mounting arm 26 for the belt is especially advantageous in solving the problem of removing a plurality of pie tins from a unitary holder plate 4, with the pie tins moving abreast, without interference with the holder plates or the pie pans and their contents.

The removing assembly also includes correspondingly inclined pan-shaped channels or troughs 35 which are secured beneath the arms 26 and extend longitudinally beneath the pie pans being removed, from the initial conveyor made up of the conveyor chains 5, to a terminus of the removing conveyor assembly. These troughs serve to assure removal of the pie pans and contents without accidental or other contact with the pans, avoiding jarring, tipping and spilling.

In operation in a bakery, the conveyor assembly 1 is aligned and registered with suitable apparatus for placing empty or filled receptacles on the conveyor, and with dough sheeting, filling, crimping, cut-off and like apparatus. The initial conveyor, comprising the endless chains 5 mounted in a conventional manner, and the holder plates secured on the conveyor chains for movement therewith, travel with the pie pans or other receptacles through the several operations to the removal zone, which is the zone commencing with the second conveyor, which includes the elevating belt 18.

The elevating belt travels at a linear velocity equivalent to that of the chains 5, so that it moves beneath and into contact with the pie pans 2 in the holders 9 at the same velocity. The pans are thus gradually unseated or cammed into raised positions above the holder plates 4 while moving longitudinally on the conveyor assembly, smoothly and evenly and without jarring or spilling the contents. When the pans reach positions above the elevating belt support 22, the tapped ends 32 of the removing arms 26 are directed between laterally adjacent elevated pans, guiding them onto the removing conveyor assembly. As forward movement progresses, the pans are picked up and carried on the upper surfaces of the removing belts 25, which gradually elevate them further above the holder plates 4, until the pans are clear of the holder plates, which may then turn under the reverse direction with the endless chains 5. The pans once clear of the chain conveyor assembly may be removed in an inclined path or they can be conveyed horizontally or in any other manner as desired, so long as they are not subjected to excessive movement. Subsequently, operation such as baking, freezing and packaging may take place.

The conveyor assembly 1 and the elements thereof are mounted in conventional manner not illustrated, and if desired, they can be driven by common drive means, arranged with the drive sprockets and drive rollers for synchronous movement. Owing to the described construction, the several conveyors may travel at a high rate of speed in timed relationship to other rapid operations with associated apparatus. The construction is especially suited to maintain a rapid rate of travel without danger of jarring, tilting or dropping the receptacles, thus avoiding crushing, distortion, spilling and other objectionable results.

The conveyor assembly 1 may also be operated in the reverse direction, by reversing the direction of travel of the conveyor chains 5, the removing belt 25, which becomes a supply belt, and the elevating belt 18, which becomes a seating belt. Alternatively, such an arrangement may be employed at the supply end of the same conveyor assembly, together with the construction illustrated at the removing end.

While the preferred embodiment illustrated is especially adapted for filling, transporting and removing pie pans and the like, it can advantageously be employed in like manner for other bakery goods, especially those which are fragile or fluid in nature. Cakes, cookies, tarts and various pastries may be processed and conveyed in suitable receptacles, and in an appropriate type of operation, the foodstuff may be seated directly on the holders 9, without employing a receptacle such as the pan 2. In such instances, the holder plates 4 and the holders 9 are appropriately shaped, and the arrangement of the conveyor assembly 1 is appropriately adjusted.

The receptacles conveyed by the assembly are most advantageously rounded, dish or pan-shaped and substantially flat-bottomed, and have a wide base relative to their height, with a relatively low center of gravity for the filled receptacles. The receptacles have an outwardly extending lip or flange, by which they are removed. The construction and arrangement of the apparatus are such as to be especially adapted to flanged pie pans, cake pans, tart containers and like receptacles constructed of sheet metal, metal foil, plastic, cardboard, paper and the like.

The assembly is especially compact and requires a small number of parts. The construction of the holder plates 4 as lightweight aluminum castings is very advantageous in reducing the weight of the assembly and avoiding problems of corrosion and contamination. The holder plates are suited for use in various ways as desired, for example, a plurality of the holder plates may be aligned across a corresponding number of parallel conveyor chains 5, for processing foodstuffs in as many receptacles abreast of each other as desired. The holder plates are easily assembled and disassembled by means of the link connections 6.

In this manner, the invention provides a conveyor assembly and holders therefor which very effectively solves the problems encountered in the manufacture and distribution of foodstuffs. The construction is suited for use in large and small installations alike, and it is especially attractive to the small users unable to finance large, complicated or costly construction and equipment. The conveyor apparatus is simply operated in a very reliable manner, minimizing waste and other expense. The useful life of the apparatus is long, and maintenance and replacement costs are small. The equipment easily can be kept clean and the foodstuff safeguarded from contamination, as required in the food processing.

The invention is hereby claimed as follows:

1. A conveyor assembly for transporting foodstuffs comprising in combination, a conveyor, recessed unitary food receptacle holders movable therewith and having openings in the bottoms and sides of the recessed portions of the holders, said openings being so formed in the bottom and opposite sides of each of said holders as to permit a traveling conveyor to pass through said sides of each of said holders and contact the bottom of a receptacle held in each of said holders, a second conveyor arranged to contact receptacles by passing through said openings and thereby unseat said receptacles from said holders, and a third conveyor arranged to remove unseated articles from above said holders.

2. A conveyor assembly for transporting foodstuffs comprising in combination, a conveyor, recessed unitary pie pan holders movable therewith and having openings in the bottoms and sides of the recessed portions of the holders, said openings being so formed in the bottom and opposite sides of each of said holders as to permit a traveling conveyor to pass through said sides of each of said holders and contact the bottom of a pie pan held in each of said holders, a second conveyor arranged to contact pie pans by passing through said openings and thereby unseat said pie pans from said holders, and a third conveyor comprising a pair of spaced apart belts arranged to extend over said holders in their positions wherein pie pans are unseated and to extend under the pie pan lips on opposite sides thereof for conveying the pie pans by the lips from the holders.

3. A conveyor assembly for transporting foodstuffs comprising in combination, a conveyor, recessed unitary food receptacle holders movable therewith and having openings in the bottoms and sides of the recessed portions of the holders, said openings being so formed in the bottom and opposite sides of each of said holders as to permit a traveling conveyor to pass through said sides of each of said holders and contact the bottom of a receptacle held in each of said holders, said holders being arranged in multiple in a holder plate for conveying ranks of holders, a corresponding multiplicity of second conveyors arranged to contact flanged receptacles by passing through said openings in the respective holders and thereby unseat said receptacles from the holders, and a plurality of third conveyors arranged to extend over said holders in their positions wherein receptacles are unseated and to extend under the receptacle flanges on opposite sides thereof for conveying the receptacles by the flanges from the holders in the same direction.

4. A conveyor assembly for transporting foodstuffs comprising in combination, a conveyor, recessed unitary pie pan holders movable therewith and having openings in the bottoms and sides of the recessed portions of the holders, said openings being so formed in the bottom and opposite sides of each of said holders as to permit a traveling conveyor to pass through said sides of each of said holders and contact the bottom of a pie pan held in each of said holders, said holders being arranged in multiple in a holder plate for conveying ranks of holders, a corresponding multiplicity of conveyor belts arranged to contact pie pans by passing through said openings in the respective holders and thereby unseat said pie pans from the holders, and a plurality of conveyor belts arranged to extend over said holders in their positions wherein pie pans are unseated and to extend under the pie pan lips on opposite sides thereof for conveying the pie pans by the lips from the holders in the same direction, one said last-named conveyor belt serving to carry the lips of two laterally adjacent pie pans simultaneously.

5. A conveyor assembly for transporting foodstuffs comprising in combination, a conveyor, unitary food receptacle holders movable therewith, said holders having recesses therein and having generally rectangular shaped openings in the bottoms and sides of the recessed portions thereof, a second conveyor inclined with respect to said first-named conveyor and arranged to pass through said openings to contact receptacles carried by said holders and unseat them from the holders, means for driving said first-named conveyor, and means for driving said second conveyor with the same horizontal component of velocity as said first-named conveyor.

6. A conveyor assembly for transporting foodstuffs comprising in combination, a conveyor, unitary pie pan holders movable therewith, said holders having recesses therein and having generally rectangular shaped openings in the bottoms and sides of the recessed portions thereof, said holders also being constructed for molding pie dough in pie pans therein, a second conveyor inclined with respect to said first-named conveyor and arranged to pass through said openings to contact pie pans carried by said holders and unseat them from the holders, means for driving said first-named conveyor, and means for driving said second conveyor with the same horizontal components of velocity as said first-named conveyor.

7. A conveyor assembly for transporting foodstuffs comprising in combination, a conveyor, unitary pie pan holders movable therewith, said holders having recesses therein and having generally rectangular shaped openings in the bottoms and sides of the recessed portions thereof, said holders being arranged in multiple in a holder plate for conveying ranks of holders, a corresponding multiplicity of second conveyors inclined with respect to said first-named conveyor and arranged to pass through openings in the respective said holders to contact pie pans carried by said holders and unseat them from the holders, means for driving said first-named conveyor, and means for driving said second conveyors with the same horizontal component of velocity as said first-named conveyor.

References Cited in the file of this patent

UNITED STATES PATENTS

| | | |
|---|---|---|
| 683,039 | Hagen | Sept. 24, 1901 |
| 781,839 | Miller | Feb. 7, 1905 |
| 815,707 | Hutchison | Mar. 20, 1906 |
| 2,344,000 | Read | Mar. 14, 1944 |
| 2,546,318 | Rayburn | Mar. 27, 1951 |
| 2,804,966 | McCabe | Sept. 3, 1957 |